June 7, 1955 — H. B. OLSEN — 2,710,235
BEARING BRACKET
Filed April 1, 1953
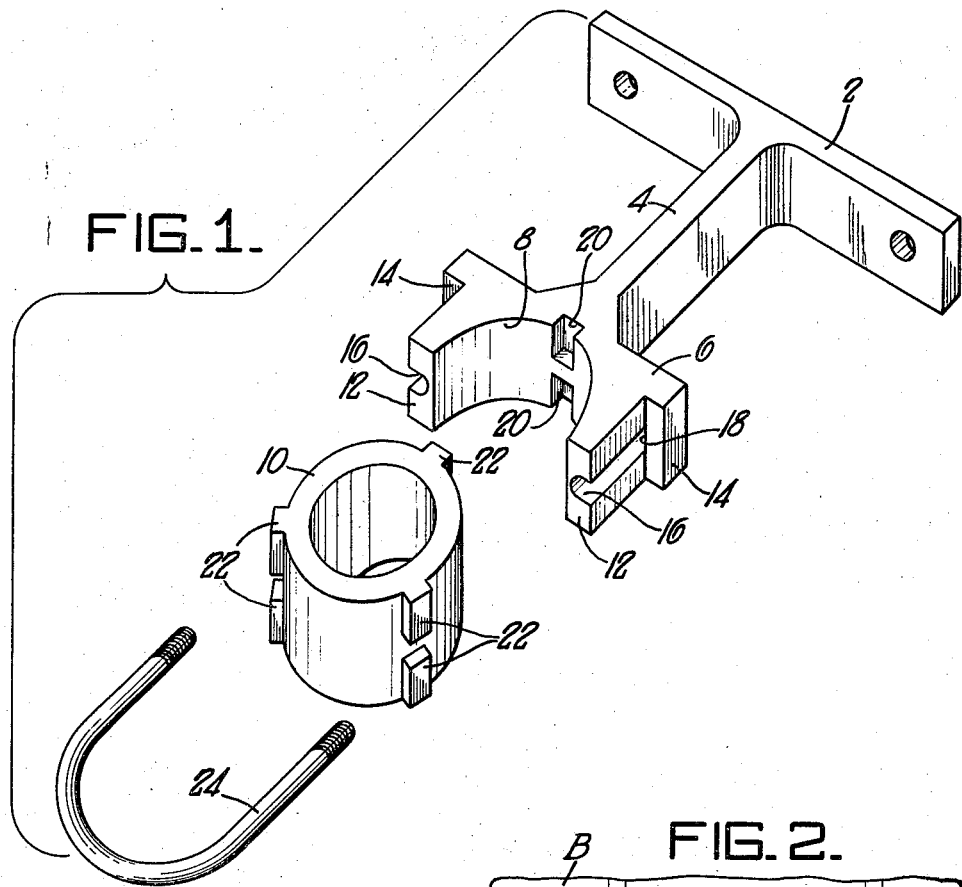
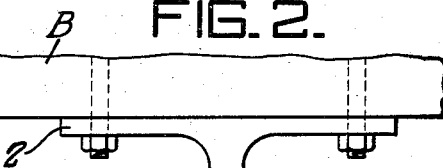
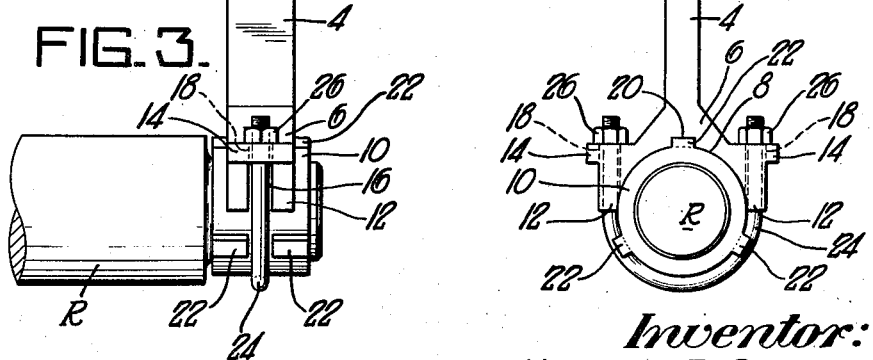
Inventor:
HARTVIG B. OLSEN,
by: Donald G. Dalton
his Attorney.

United States Patent Office 2,710,235
Patented June 7, 1955

2,710,235

BEARING BRACKET

Hartvig B. Olsen, Chicago, Ill., assignor to Universal Atlas Cement Company, a corporation of Indiana Application April 1, 1953, Serial No. 346,225

3 Claims. (Cl. 308—63)

The present invention relates generally to bearing supports and more particularly to an improved multi-position bearing bracket for supporting rotatable shafts and the like.

It is an object of the present invention to provide a bearing bracket having a plurality of interchangeable bearing surfaces.

It is a further object of the invention to provide a bearing bracket having a removable bearing sleeve which may be quickly and easily adjusted to different wearing positions whereby worn bearing surfaces may be replaced.

The invention will be fully apparent from the following detailed disclosure and the appended claims when read in connection with the accompanying drawing in which:

Figure 1 is a composite view of the invention;
Figure 2 is an end view; and
Figure 3 is a side elevation.

Referring more particularly to the drawing, reference numeral 2 indicates the mounting base of the improved bearing bracket of my invention. An integral elongated support member 4 projects from the mid-portion of the base normal thereto. The end of the member 4 remote from the base is enlarged in the shape of a substantially rectangular sleeve cradle or receptacle 6. The cradle 6 is provided with a semi-circular recess 8 in its outer face adapted to receive a bearing sleeve 10. The ends 12 of the cradle are undercut so as to form shoulders 14 on the inner face of the cradle. Each of the ends 12 has a groove 16 extending along the length thereof which communicates with a hole 18 in each shoulder. The spaced notches 20 are provided in the mid-portion of the inner wall of the recess. The sleeve 10, which is preferably made of a wear-resistant metal such as cast manganese steel or similar material, is formed with three pairs of spaced projections 22 disposed around its periphery in spaced relation. As shown in Figures 2 and 3, the sleeve 10 seats in the cradle recess 8 with one of the pairs of projections 22 fitted into the notches 20 and a peripheral portion thereof projecting outwardly of the recess. The engagement of the projections within the notches prevents lateral movement of the sleeve in the recess. A U bolt 24 and co-operating nuts 26 hold the sleeve 10 and cradle 6 together. The legs of the U bolt 24 fit between the spaced projections 22 around that portion of the sleeve 10 which projects from the cradle 6 and extend from there along the grooves 16 to project through the holes 18. The nuts 26 are threaded around the projecting ends of the U bolt and bear against the inner face of the cradle to hold the sleeve securely in place.

For the purpose of illustration, I have shown, in Figures 2 and 3, my device mounted in dependent position on a beam B for supporting one end of the shaft of a conveyor roller R. Although I have shown the bracket mounted in depending position, it will be noted that the advantages of the invention may be realized equally as well when the bracket is mounted in upright position.

When used for the purpose of journaling a shaft, as shown in Figures 2 and 3, it is obvious that the bottom portion of the inner wall surface of the sleeve 10 will become worn after extended use. When this occurs, nuts 26 are removed from the projecting legs of the U bolt 24, the sleeve 10 is removed from the recess 8, turned 120 degrees and then refitted into the recess. Thus a new bearing surface for the rotating shaft is provided quickly and easily. Another important advantage resulting from the use of my invention is the fact that the entire bearing surface of the sleeve may be utilized before it is necessary to regrind or discard the sleeve.

It will be understood that the shape of the recess 8 may be varied as desired to accommodate sleeves having outer contours that are other than round in shape. Other securing means may be substituted for the U bolt if found more convenient or the shape of the U bolt may be modified to accommodate various shaped sleeves.

While one embodiment of my invention has been shown and described it will be apparent that other adaptations and modifications may be made without departing from the scope of the following claims.

I claim:

1. A multi-position bearing bracket comprising a mounting base, an elongated support member projecting from said base intermediate its ends and normal thereto, a bearing sleeve cradle on the end of said support member remote from said base, said cradle being substantially rectangular in shape and having an inner face adjacent the end of said support member and an outer face remote therefrom, said cradle having a recess in the outer face thereof and a lengthwise groove in each end thereof, said recess having a pair of spaced notches in the inner wall thereof intermediate its ends, a bearing sleeve having a plurality of pairs of spaced projections spaced around the periphery thereof, said sleeve being seated in said recess with one of said pairs of projections fitted into said pair of notches, a peripheral portion of said sleeve projecting outwardly of said recess, and removable securing means engaging said sleeve and said cradle to retain said sleeve within said recess, said securing means including a U bolt having a pair of spaced legs and an intermediate portion therebetween, said bolt being positioned with the intermediate portion thereof engaging the peripheral portion of said sleeve projecting from said recess and the legs thereof fitted between the spaced projections on said projecting peripheral portion, the space between the projections in each pair being slightly greater than the diameter of said bolt, said legs extending from said sleeve along said grooves and projecting from the inner face of said cradle, and a nut threaded on the projecting portion of each leg and bearing against said inner face.

2. A multi-position bearing device comprising a bracket, a bearing sleeve cradle on said bracket, said cradle having a recess in the face thereof, said recess having a pair of axially spaced notches in the wall thereof intermediate its ends, a bearing sleeve having a plurality of pairs of axially spaced projections spaced around the periphery thereof, said sleeve being seated in said recess with one of said pairs of projections fitted into said pair of notches, and removable securing means engaging said sleeve and said cradle to retain said sleeve within said recess, said securing means including a U bolt having a pair of spaced legs and an intermediate portion therebetween, said bolt being positioned with the intermediate portion thereof engaging the peripheral portion of said sleeve projecting from said recess and the legs thereof fitted between the spaced projections on said projecting peripheral portion, the space between the projections in each pair being slightly greater than the diameter of said bolt, said legs extending from said sleeve along said grooves and projecting from the inner face of said cradle, and a nut threaded on the projecting portion of each leg and bearing against said inner face.

3. A multi-position bearing device comprising a bracket, a bearing sleeve cradle on said bracket, said cradle being substantially rectangular in shape and having an inner face adjacent said bracket and an outer face remote therefrom, said cradle having a recess in the outer face thereof and a transverse groove in each end thereof, said recess having a pair of spaced notches in the inner wall thereof intermediate its ends, a bearing sleeve having a plurality of pairs of spaced projections spaced around the periphery thereof, said sleeve being seated in said recess with one of said pairs of projections fitted into said pair of notches, a peripheral portion of said sleeve projecting outwardly of said recess, and removable securing means engaging said sleeve and said cradle to retain said sleeve within said recess, said securing means including a U bolt having a pair of spaced legs and an intermediate portion therebetween, said bolt being positioned with the intermediate portion thereof engaging the peripheral portion of said sleeve projecting from said recess and the legs thereof fitted between the spaced projections on said projecting peripheral portion, the space between the projections in each pair being slightly greater than the diameter of said bolt, said legs extending from said sleeve along said grooves and projecting from the inner face of said cradle, and a nut threaded on the projecting portion of each leg and bearing against said inner face.

References Cited in the file of this patent

UNITED STATES PATENTS

| | | |
|---|---|---|
| 245,343 | Bradley | Aug. 9, 1881 |
| 445,787 | Ruef | Feb. 3, 1891 |
| 476,158 | Morton | May 31, 1892 |
| 1,645,041 | Clarkson, Jr. | Oct. 11, 1927 |
| 2,573,574 | Johansen | Oct. 30, 1951 |